United States Patent Office 3,576,804
Patented Apr. 27, 1971

3,576,804
FLUOROTRIAZINE COMPOUNDS
Erich Klauke, Odenthal-Hahnenberg, Hans-Samuel Bien, Burscheid, and Alfons Dorlars, Leverkusen, Germany, assignors to Farbenfabriken Bayer Aktiengesellschaft, Leverkusen, Germany
No Drawing. Filed May 2, 1968, Ser. No. 726,247
Claims priority, application Germany, May 11, 1967, F 52,384; Jan. 20, 1968, F 54,592
Int. Cl. C07d 55/48
U.S. Cl. 260—248                    5 Claims

ABSTRACT OF THE DISCLOSURE

In the process for the production of difluoro-s-triazine compounds the improvement which comprises reacting a 2,4-dichloro-s-triazine compound containing in the 6-position a hydrocarbon or substituted hydrocarbon radical which is bound directly or via a hetero atom, with anhydrous hydrofluoric acid at a temperature of from about $-20°$ C. to about $+80°$ C. until the corresponding 2,4-difluoro compound is formed.

---

It is known from British patent specification No. 873,251 to react fluorinated 1,3,5-triazines by the reaction of cyanuric chloride with hydrogen fluoride at elevated temperature, in the absence of water. In this process the preferred temperature range lies at 100 to 350° C., advantageously with the concurrent use of catalysts.

For the production of fluorinated triazine compounds which contain a further substituent of another type, e.g. an aryl group attached to a carbon atom of the symmetric triazine ring, from the appropriate chlorine compounds far more energetic reaction conditions are necessary as has been disclosed in U.S. patent specification No. 2,845,421. The example of 2,4-dichloro-6-phenyl-s-triazine here serves to illustrate that the exchange of the two chlorine substituents for the fluorine substituents is carried out with a mixture of antimony trifluoride and antimony trichloride and chlorine at temperatures of 160 to 180° C.

It has now been found that, surprisingly, 2,4-difluoro-s-triazines containing in the 6-position a hydrocarbon radical which is bound directly or via a hetero atom and which may be further substituted, can be obtained under extraordinarily simple and mild reaction conditions with a good yield by reacting the corresponding 2,4-dichloro compounds with anhydrous hydrofluoric acid at temperatures of about $-20$ to $+80°$ C.

Hetero atoms through which may be attached to the carbon atom of the triazine ring the hydrocarbon radicals present in the 6-position of the triazine ring, are especially oxygen, sulphur and nitrogen atoms.

According to the inventive process 2,4-dichloro-s-triazines which contain in 6-position a hydrocarbon residue bound directly or via an oxygen or sulphur atom and which may be further substituted can be reacted with particular advantage with anhydrous hydrofluoric acid at temperatures of from about $-20°$ C. to about $+30°$ C. to yield the corresponding 2,4-difluorotriazine compounds. 2,4-dichloro-s-triazine compounds which contain an aromatic hydrocarbon residue bound in 6-position via an N-atom and which may be further substituted are reacted with anhydrous hydrofluoric acid preferably at temperatures of from about $+20°$ C. to about $+50°$ C. 2,4-dihydrocarbon residue bound in 6-position via an N-atom chloro-s-triazine compounds which contain an aliphatic and which may be further substituted are reacted with anhydrous hydrofluoric acid preferably at temperatures of from about $+20°$ C. to about $+80°$ C. to yield the corresponding 2,4-difluoro-triazine compounds. In the latter cases the components are, however, combined at somewhat lower temperatures as to make easier the fluorination reaction in view of the boiling point of hydrofluoric acid ($+20°$ C.) and the necessary working under pressure at higher temperatures.

The reaction according to the invention can be carried out by starting with the anhydrous hydrofluoric acid and then adding at lower temperatures, expediently below the boiling point of the hydrofluoric acid ($+20°$ C.), preferably within a range of $-20$ to $0°$ C., the 2,4-dichloro-s-triazine derivative which contains in the 6-position a substituent of the above characterised type. Crystalline dichlorotriazine compounds can previously be dissolved in inert organic solvents, such as methylene chloride, carbon tetrachloride, benzene, chlorobenzene or carbon disulphide. The hydrochloric acid formed in the reaction is discharged via a reflux condenser.

At least 2 mol hydrofluoric acid for one mol of the 2,4-dichlorotriazine to be fluorinated are required for the reaction. An excess of hydrofluoric acid is expediently used, e.g. up to about 10 mol, and the excess of hydrofluoric acid is removed by distillation after completion of the reaction.

The fluorination reaction according to the invention generally proceeds fairly rapidly already at temperatures of about 0 to about 20° C., which can be observed by the vigorous evolution of hydrogen chloride. Sometimes it is advantageous to operate under a slight excess pressure at an elevated temperature (up to 80° C.) to complete the reaction.

The reaction products are isolated and purified after distilling off the excess hydrofluoric acid, in general by distillation and occasionally by recrystallisation of the residue.

2,4 - dichlorotriazine - 1,3,5 compounds to be used as starting materials according to the invention are, for example, those which contain in the 6-position one of the following substituents: methyl, ethyl, i-propyl, n-hexyl, cyclohexyl, 2-alkyl-hexyl, ethoxyethyl, phenyl, 4-chlorophenyl, 2-chlorophenyl, 3,4-dichlorophenyl, 4-nitrophenyl, 3-methoxyphenyl, 4-carboethoxyphenyl, methoxy, ethoxy, sec. butoxy, 4-chlorophenoxy, 3-nitrophenoxy, 2-phenoxyethoxy, dimethylamino, diethylamino, methylphenylamino, methylmercapto and 4-methylphenylmercapto groups.

The course of the reaction according to the invention is especially surprising as dichlorotriazine compounds which contain in the 6-position another substituent than halogen are with regard to the lability of the chlorine substituents less reactive than the corresponding trichloro-s-triazine (cyanuric chloride). Since, according to the statements of British patent specification No. 873,251, more energetic reaction conditions are deemed advantageous or necessary even for the reaction of the cyanuric chloride with hydrofluoric acid, for example a reaction within a range of 100 to 350° C., and since, according to the process of U.S. patent specification No. 2,845,421, an intensification of the reaction conditions seemed necessary even far more for the derivatives of cyanuric chloride differently substituted in the 6-position, it must be regarded as extremely surprising that, according to the present process, many of the dichlorotriazine derivatives employed in the process of this invention can be reacted already at room temperature, with a high yield and purity to give the corresponding fluorine derivatives.

The products obtainable by the process of the present invention are valuable as heat transfer media, coolants and moderators as described in U.S. patent specification No. 2,845,421.

EXAMPLE 1

200 ml. of anhydrous HF are placed into a vessel of 1 litre capacity, provided with stirrer and made of stainless steel. A solution of 6-methoxy-2,4-dichlorotriazine is added at 0° C. within 20 minutes. A rapid HCl evolution occurs. As and when the HCl evolution subsides, the internal temperature is raised to 20° C. When this final temperature is reached, stirring is continued for a further 5 hours, the hydrofluoric acid is subsequently drawn off in a vacuum, and the residue of 155 g. is purified by distillation. As the main runnings there are obtained 135 g. 2,4-difluoro-6-methoxy-s-triazine in the form of a water-clear liquid of B.P. 73° C./33, $n_D^{20}$: 1.4346. The content is 98.5% according to chromatographic analysis.

EXAMPLE 2

A suspension of 243 g. 2,4-dichloro-6-methyl-s-triazine is placed into an apparatus as described in Example 1. 180 ml. of anhydrous HF are allowed to run in at 0° C. without stirring. When the vigorous HCl evolution which occurs subsides, stirring is slowly started and the internal temperature is then raised to 20° C. After a total reaction time of about 10 hours, the reaction is completed, and 149 g. 2,4-difluoro-6-methyl-s-triazine is isolated by distillation as a liquid of B.P. 112 to 114° C. and an index of $n_D^{20}$: 1.4208.

EXAMPLE 3

In an apparatus and by a reaction procedure according to Example 2, 226 g. 2,4-dichloro-6-phenyl-s-triazine are reacted with 120 ml. of anhydrous HF. 196 g. of a crystalline residue are isolated. Therefrom are obtained, by recrystallization from light gasoline, 163 g. 2,4-difluoro-6-phenyl-s-triazine of M.P. 108 to 109° C. (in literature mistakenly M.P. 98.5 to 99° C., Am. Soc. 81, 3769 [1959]).

*Analysis.*—$C_9H_5F_2N_3$, (M.W. 193). Calculated (percent): C, 56.0; H, 2.65; N, 21.8; F, 19.7. Found (percent): C, 56.1; H, 2.80; N, 22.1; F, 19.1.

According to the process described in these examples, by using the corresponding starting components the following compounds are also obtained:

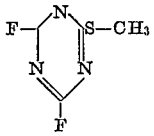

B.P. 177° C./760, B.P. 82° C./13, $n_D^{20}$: 1.5145

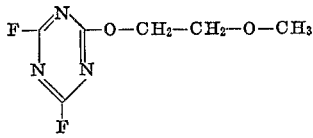

B.P 101° C./10, $n_D^{20}$: 1.4449

EXAMPLE 4

A slurry of 210 g. of 2,4-dichloro-6-N-phenylamino-s-triazine in 100 ml. of methylene chloride is given into a 1 litre pressure vessel with stirrer, manometer, dropping funnel and reflux condenser which is connected with a waste gas line via a valve. At an internal temperature of 0° C. and with slow stirring 200 ml. of anhydrous HF are added within 15 minutes. After this addition which leads to an exothermic reaction, stirring is made faster and the temperature slowly raised to 20° C. while a rapid HCl evolution occurs. After 3 hours the rapid HCl evolution has finished and the reaction mixture is heated for completion of the reaction shortly to 50° C. while closing the reaction vessel. Thereafter the mixture is cooled down to room temperature and excess HF and excess solvent distilled off under slight vacuum. The residue amounts to 199 g. and has a melting point of 138 to 140° C. It is recrystallized once from benzene, and the 2,4-difluoro-6-N-phenylamino-s-triazine thus obtained has a melting point of 140 to 141° C.

In a similar manner the following difluoro triazine compounds are obtainable from the corresponding dichloro starting materials:

| | M.P.,° C. |
|---|---|
| 2,4 - difluoro - 6 - (n - phenyl - N - methylamino)-s-triazine | 101–103 |
| 2,4 - difluoro - 6 - N - (2 - methylphenylamino)-s-triazine | 85–86.5 |
| 2,4 - difluoro - 6 - N - (2,6 - dimethylphenylamino)-s-triazine | 135–137 |

EXAMPLE 5

320 g. of 2,4-dichloro-6-N-n-butylamino-triazine-1,3,5, 150 ml. of methylene chloride and 150 ml. of HF are given into an apparatus as described in Example 4. At room temperature substantially no reaction occurs. The apparatus is closed, 2 atmospheres excess pressure of nitrogen are pressed in the apparatus and the reaction vessel heated within one hour to 75° C. At 40° C. a distinct HCl evolution starts which becomes rapid at about 60° C. At 75° C. the exchange of the chlorine atoms by fluorine atoms is finished by stirring for 3 hours. The HCl obtained is removed by expanding the internal pressure which exceeds 5.6 gauge pressure. The reaction solution thus obtained is cooled down, the vessel expanded and excess HF and excess solvent distilled off. Crude yield: 265 g. (97.5% of the theory). By distillation 207 g. (76%) of pure 2,4-difluoro-6-N-n-butylamino-triazine-1,3,5 are obtained. B.P. 138 to 139° C./15 mm. M.P. 35.5° C.

In a similar manner the following difluoro-6-substituted triazine derivatives are obtained from the corresponding dichloro starting materials:

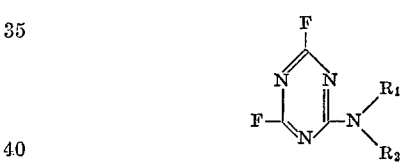

| R₁ | R₂ | B.P./15 | M.P.,° C. |
|---|---|---|---|
| H | CH₃ | | 113 |
| H | Benzyl | | 97–100 |
| CH₃ | CH₂CH₂CN | Slowly cryst. yellow oil | |
| C₂H₅ | C₂H₅ | $n_D^{20}$=1.4978 | 96–98 |

We claim:
1. In the process for the production of difluoro-s-triazine compound containing in the 6-position a member selected from the group consisting of alkyl having 1–6 carbon atoms; alkyl having 1–6 carbon atoms substituted by lower alkoxy; cyclohexyl; phenyl substituted by chloro, nitro, lower alkoxy or carbo lower alkoxy; lower alkoxy; lower alkoxy substituted by chloro or nitro; lower alkylmercapto; phenylmercapto substituted by lower alkyl and amino mono- or disubstituted by a member selected from the group consisting of lower alkyl; lower alkyl substituted by cyano; phenyl; phenyl substituted by lower alkyl; and phenyl lower alkyl, which comprises fluorinating a 2,4-dichloro-s-triazine with a fluorinating agent, the improvement comprising utilizing anhydrous hydrofluoric acid as the fluorinating agent and conducting the reaction at a temperature of from about −20° C. to about +80° C. until the corresponding 2,4-difluoro compound is formed.

2. The process of claim 1 wherein 2,4-dichloro-6-phenyl-triazine is fluorinated to obtain 2,4-difluoro-6-phenyl-triazine.

3. Process according to claim 1 wherein the substituent in the 6-position is a member selected from the group consisting of alkyl having 1–6 carbon atoms; alkyl having 1–6 carbon atoms substituted by lower alkoxy; cyclohexyl; phenyl; phenyl substituted by chloro, nitro, lower alkoxy or carbo lower alkoxy; lower alkoxy; lower alkoxy substituted by chloro or nitro; lower alkylmercapto; lower alkyl substituted phenylmercapto; and wherein the reaction temperature is from about −20° C. to about +30° C.

4. Process according to claim 1 wherein the substituent in the 6-position is amino, mono- or disubstituted by a member selected from the group consisting of phenyl and phenyl substituted by lower alkyl and wherein the temperature range is from about +20° C. to about +50° C.

5. Process according to claim 1 wherein the substituent in the 6-position is amino, mono- or disubstituted by a member selected from the group consisting of lower alkyl and lower alkyl substituted by cyano, and wherein the temperature range is from about +20° C. to about +80° C.

References Cited

UNITED STATES PATENTS

| | | | |
|---|---|---|---|
| 2,845,421 | 7/1958 | Grundmann et al. | 260—248 |
| 2,912,429 | 11/1959 | Tullock | 260—248X |

OTHER REFERENCES

Kwasnik: "Fiat Review of German Science," 1939–1946, Inorganic Chemistry, Pt. 1, pp. 239–244.

JOHN M. FORD, Primary Examiner